United States Patent
Amano et al.

(10) Patent No.: US 10,988,004 B2
(45) Date of Patent: Apr. 27, 2021

(54) PRESS FORMING APPARATUS AND OUTER PANEL

(71) Applicant: SUBARU CORPORATION, Tokyo (JP)

(72) Inventors: Yuta Amano, Tokyo (JP); Shosuke Sakata, Tokyo (JP); Yu Fukazawa, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 16/239,348

(22) Filed: Jan. 3, 2019

(65) Prior Publication Data

US 2019/0217688 A1  Jul. 18, 2019

(30) Foreign Application Priority Data

Jan. 17, 2018 (JP) .............................. JP2018-005872

(51) Int. Cl.
| | |
|---|---|
| *B21D 22/02* | (2006.01) |
| *B60J 5/04* | (2006.01) |
| *B21D 22/20* | (2006.01) |
| *B21D 53/88* | (2006.01) |

(52) U.S. Cl.
CPC ............ *B60J 5/0415* (2013.01); *B21D 22/02* (2013.01); *B60J 5/0483* (2013.01); *B21D 22/20* (2013.01); *B21D 53/88* (2013.01)

(58) Field of Classification Search
CPC ........ B21D 22/02; B21D 22/20; B21D 22/22; B21D 53/88; B21D 37/02; B21D 37/10
USPC ..................................................... 72/470, 474
See application file for complete search history.

(56) References Cited

FOREIGN PATENT DOCUMENTS

| FR | 3014712 A1 * | 6/2015 | ............ B21D 37/08 |
|---|---|---|---|
| JP | 2015-96271 A | 5/2015 | |

OTHER PUBLICATIONS

Mazda technical review, "Establishment of Process for Assuring Surface Quality", 2010, No. 28, pp. 23-27. (In Japanese with English abstract).

* cited by examiner

*Primary Examiner* — Debra M Sullivan
(74) *Attorney, Agent, or Firm* — Troutman Pepper Hamilton Sanders LLP

(57) ABSTRACT

A press forming apparatus that produces a character line in a design surface of an outer panel by press forming includes an upper die and a lower die. The upper die has a die surface that is configured to form a design surface of an outer panel. The lower die has a die surface corresponding to the die surface of the upper die. The die surface of the lower die has, in a formation area of the character line, a curved convex portion that protrudes beyond an offset line of the die surface of the upper die and curved concave portions continuous with the curved convex portion. Each of the curved concave portions is on a corresponding one of both sides of the convex portion and is recessed beyond the offset line.

5 Claims, 5 Drawing Sheets

FRONT ⟵⟶ REAR

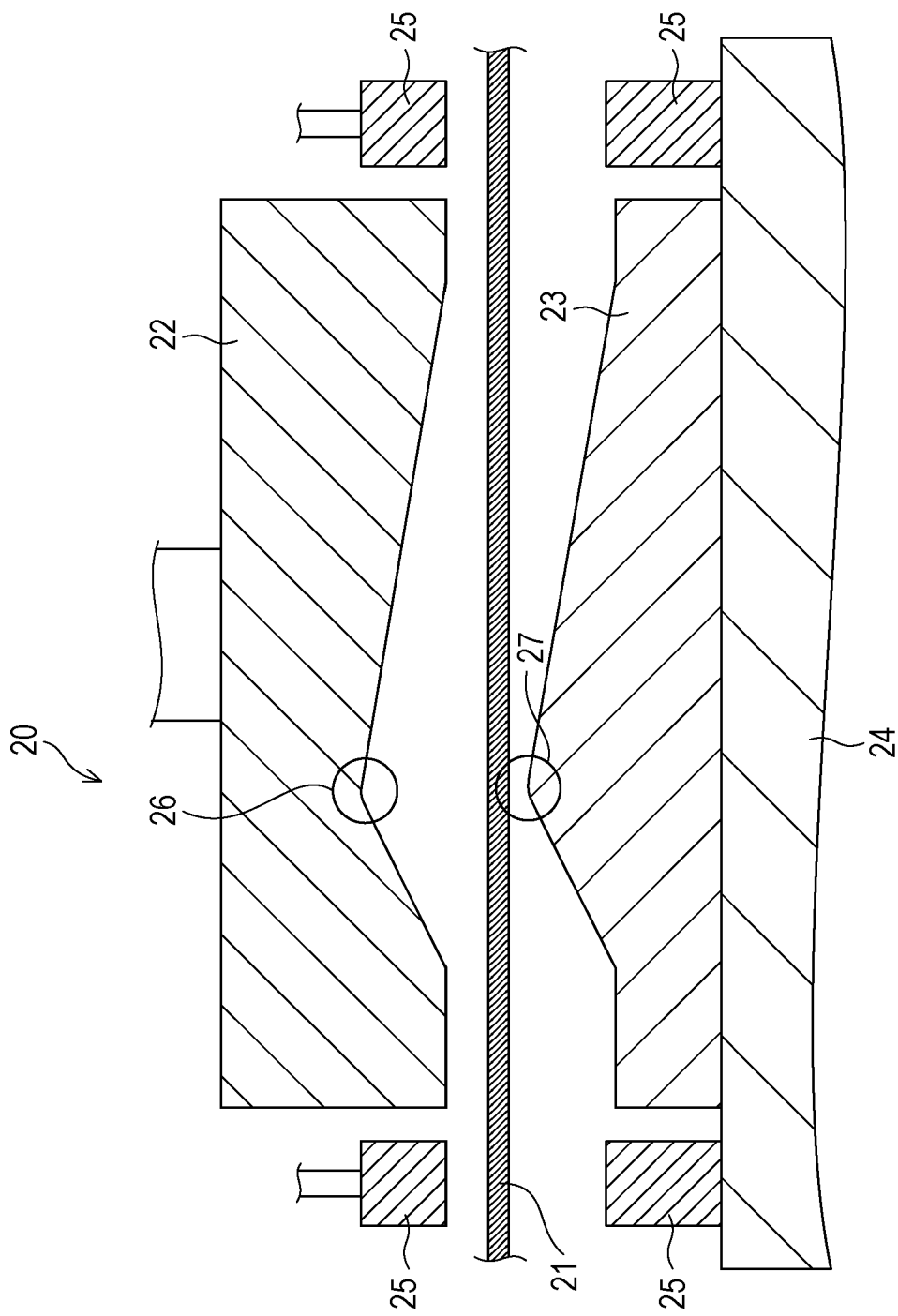

PRESS FORMING APPARATUS AND OUTER PANEL

CROSS-REFERENCE TO RELATED APPLICATIONS

The present application claims priority from Japanese Patent Application No. 2018-005872 on Jan. 17, 2018, the entire contents of which are hereby incorporated by reference.

BACKGROUND

1. Technical Field

The present invention relates to a press forming apparatus that produces a high-precision and high-quality character line in an aluminum alloy plate or the like, which is a hard-to-form material, by press forming, and to an outer panel formed by the press forming apparatus.

2. Related Art

A conventional press forming process may form a character line in an automobile outer panel formed of a hard-to-form material having a low forming limit. In such a case, the formation area of the character line is shaped into a gentle curve in a first step of drawing, and then the gentle curve is shaped into a sharp curve in a second step of restriking.

FIG. 5 illustrates a structure of a well-known press forming apparatus that produces an automobile outer panel. FIG. 5 schematically illustrates a press die of a press forming apparatus 100.

As illustrated in FIG. 5, the press forming apparatus 100 includes a press die 104 including a die 101 having a V-shaped recess, a punch 102 having a protrusion to fit in the die 101, and a crease suppressing portion 103. A lining layer 105 is disposed on a valley portion 101a of the die 101.

The lining layer 105 is an elastic member formed of a nitrile butadiene rubber plate, for example. In the press forming step, a workpiece plate 106 is fixed by the crease suppressing portion 103, and then the punch 102 is moved down to the bottom dead point. At this time, a portion of the workpiece plate 106 at the bottom dead point deforms at a sliding boundary in accordance with the elastic deformation of the lining layer 105, and tensile stress is applied to the front and rear surfaces of the workpiece plate 106, narrowing the bending moment distribution of the portion at the sliding boundary. Thus, the outer panel is unlikely to have poor exterior appearance, possibly resulting from line displacement in the press forming (see Japanese Unexamined Patent Application Publication No. 2015-96271, for example).

A known press forming process of forming a character line having a curved portion uses a die having a sharp protrusion. The curved portion of the character line is formed in a steel plate by using the protrusion area (Mazda Technical Review, 2010, p. 28, for example).

SUMMARY OF THE INVENTION

An aspect of the present invention provides a press forming apparatus configured to produce a character line in a design surface of an outer panel by press forming. The press forming apparatus includes an upper die and a lower die. The upper die has a die surface that is configured to form a design surface of an outer panel. The lower die has a die surface corresponding to the die surface of the upper die. The die surface of the lower die has, in a formation area of the character line, a curved convex portion that protrudes beyond an offset line of the die surface of the upper die and curved concave portions continuous with the curved convex portion. Each of the curved concave portions is on a corresponding one of both sides of the convex portion and is recessed beyond the offset line.

BRIEF DESCRIPTION OF THE DRAWINGS

FIG. 2 is a schematic view illustrating a press forming apparatus according to an example of the invention;

DETAILED DESCRIPTION

In the following, some preferred examples of the present invention are described in detail with reference to the accompanying drawings. Note that the following description is directed to illustrative instances of the disclosure and not to be construed as limiting to the present invention. Factors including, without limitation, numerical values, dimensions, shapes, materials, components, positions of the components, and how the components are coupled to each other are for purposes of illustration to give an easier understanding of the present invention, and are not to be construed as limiting to the present invention, unless otherwise specified. Further, elements in the following instances which are not recited in a most-generic independent claim of the disclosure are optional and may be provided on an as-needed basis. The drawings are schematic and are not intended to be drawn to scale. Throughout the specification and the drawings, elements having substantially the same function and configuration are denoted with the same minerals to avoid redundant description. Illustration of elements that are not directly related to the present invention is omitted. The conventional press forming of the character line in a hard-to-form material requires the first step of drawing and the second step of restriking, leading to complexity in the work involved in the press forming. For example, the two steps of the press forming require a press object to be moved after the first step and before the second step. The press object may be misaligned at this time, making it difficult to form a character line at a predetermined position with a high degree of precision. The high-precision and high-quality press forming is difficult to be stably performed.

Figure 5:
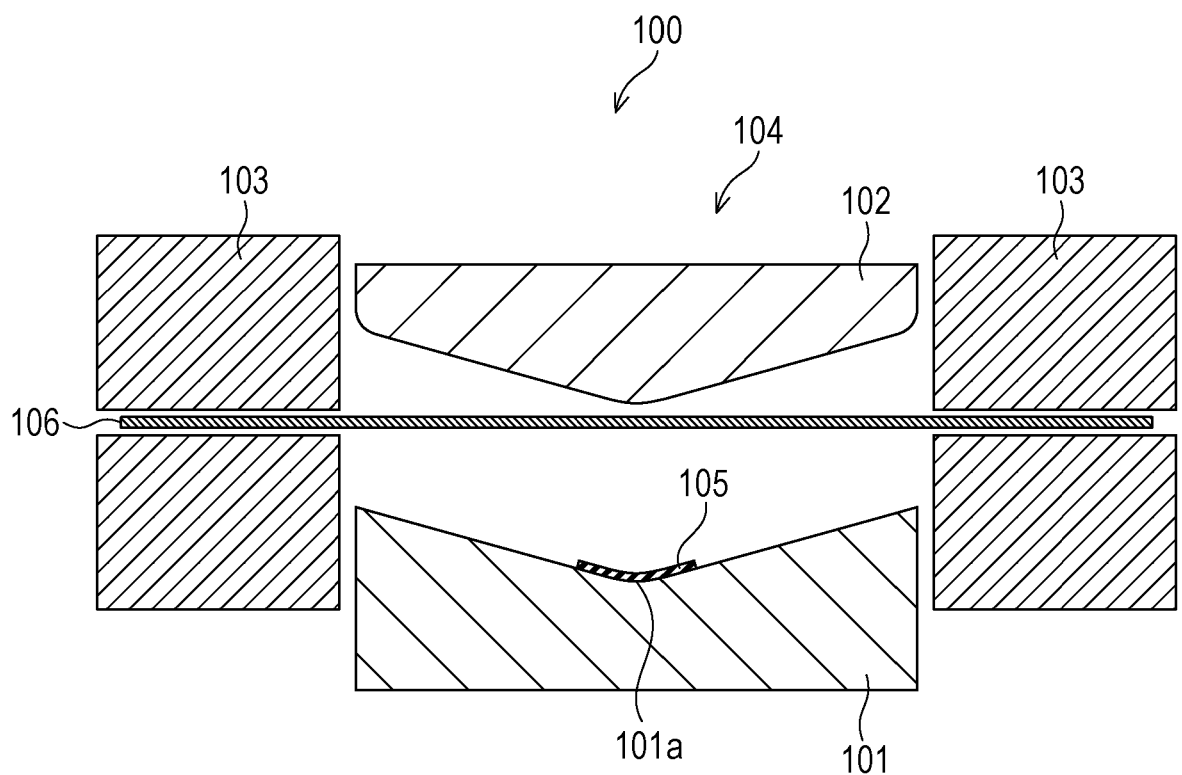
FIG. 5 is a schematic view illustrating a press die of a conventional press forming apparatus.

The press die 104 of the press forming apparatus 100 illustrated in FIG. 5 includes the lining layer 105 on the valley portion 101a of the die 101 to prevent line displacement during the press forming, which may result in poor appearance. This makes the structure of the press die 104 more complex and increases the production cost of the press die 104.

In the method of producing a character line in a steel plate by press forming, which is described in Mazda technical review, 2010, p. 28, the die surface of the lower die has a protrusion having a sharp corner. The protrusion is able to form a character line if a press-forming target is a steel plate. However, a hard-to-form material such as an aluminum alloy, which has lower critical strain for cracking than the steel plate, may be used as a press-forming target. In such a case, the protrusion may make a local thin portion in the formation area of the character line. This may readily cause cracking. The high-precision press forming may not be stably performed.

It is desirable to provide a press forming apparatus that produces a high-precision and high-quality character line in a hard-to-form material, such as an aluminum alloy plate, by press forming and to provide an outer panel formed by the press-forming apparatus to solve the above-described problems.

Figure 1A:
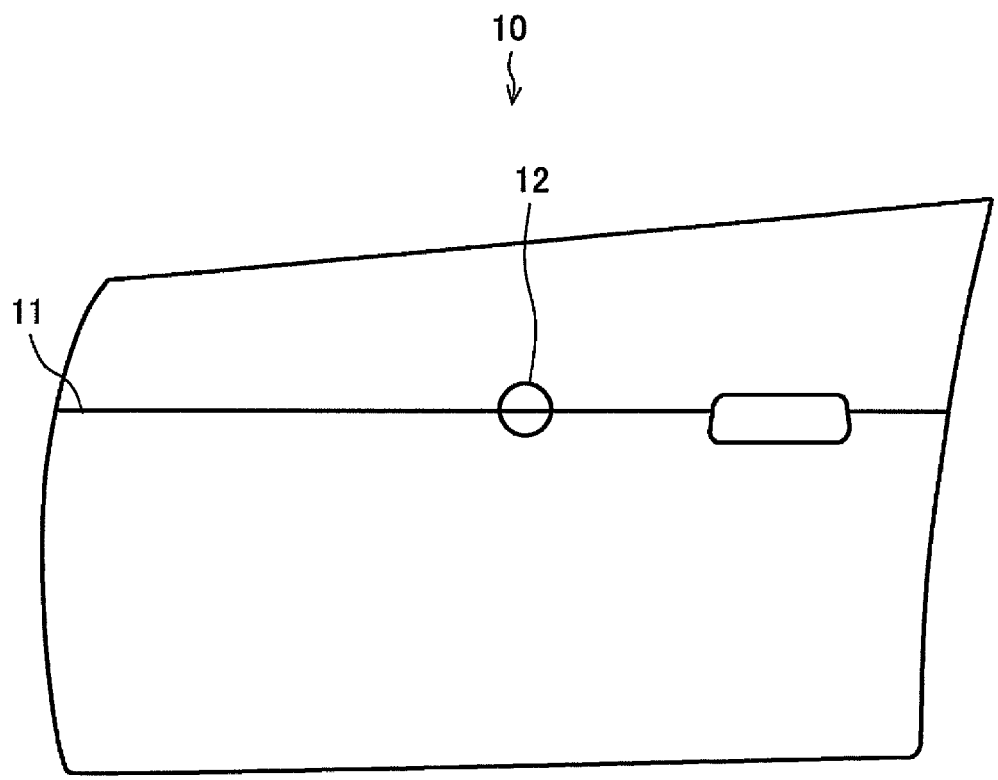
FIGS. 1A and 1B are respectively a front view and a cross-sectional view illustrating an outer panel according to an example of the invention.
Figure 1B:
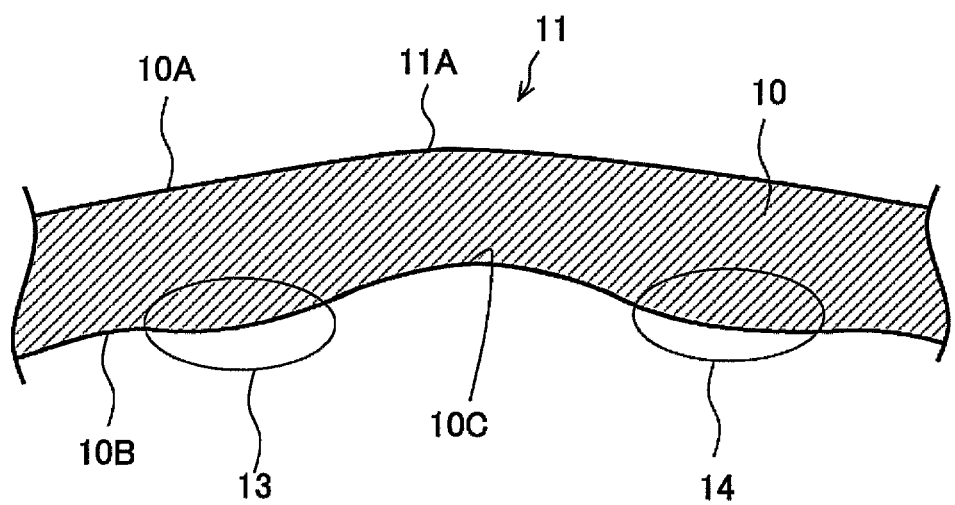
Figure 3A:
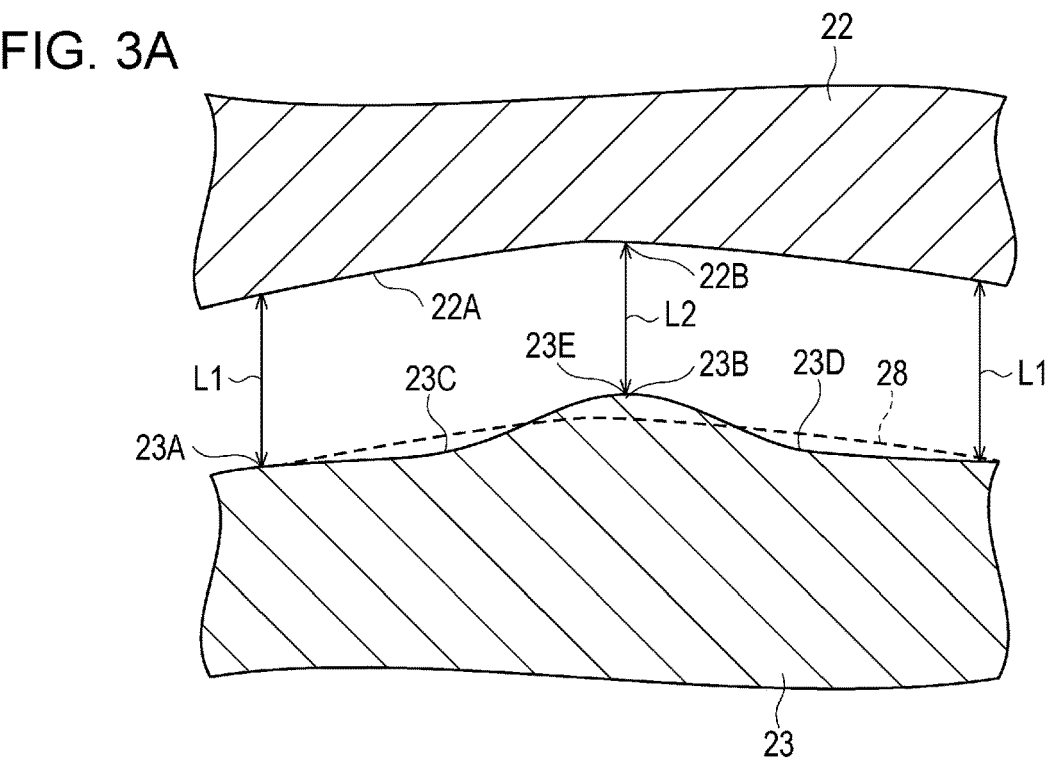
FIGS. 3A and 3B are cross-sectional views illustrating the press forming apparatus according to an example of the invention.
Figure 3B:
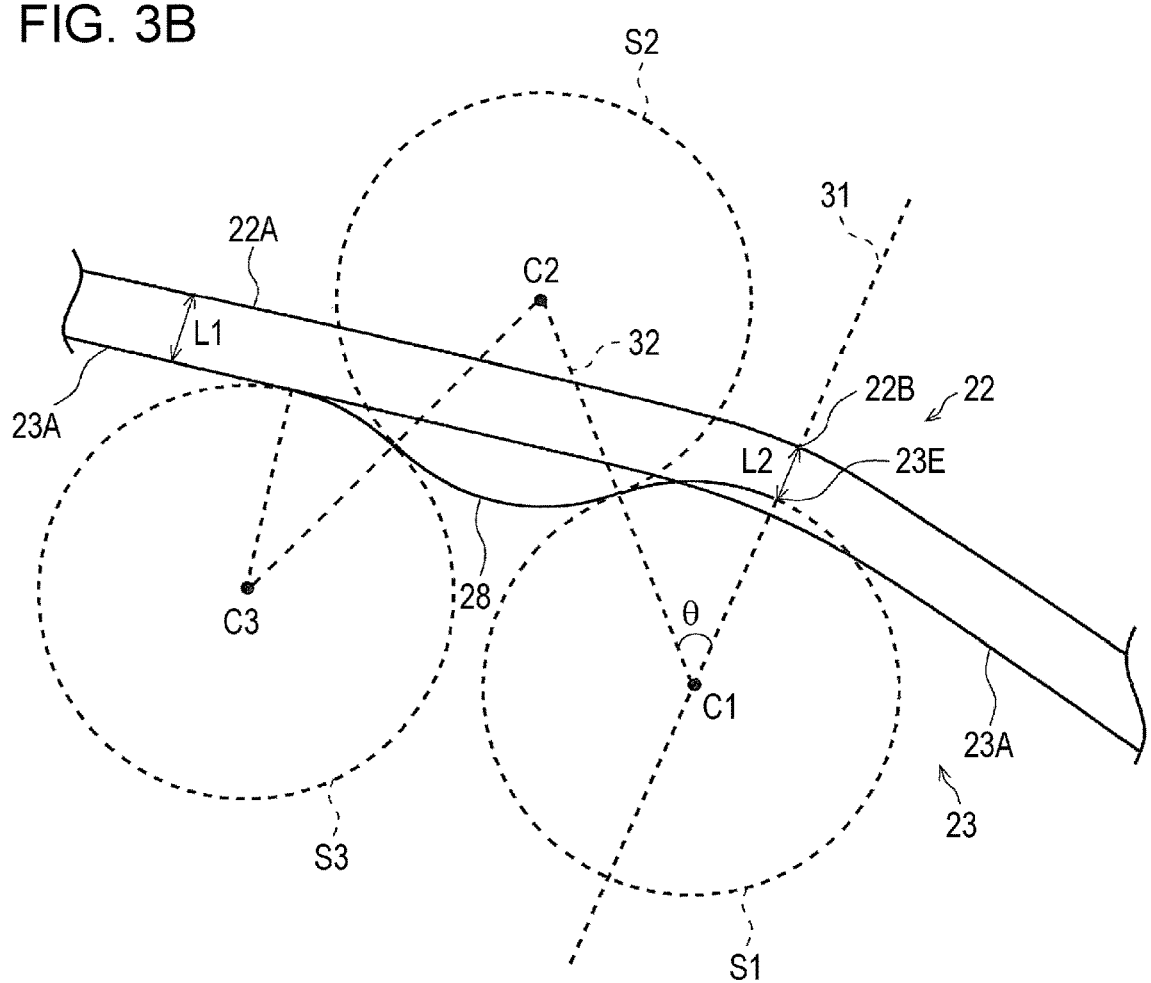
Figure 4A:
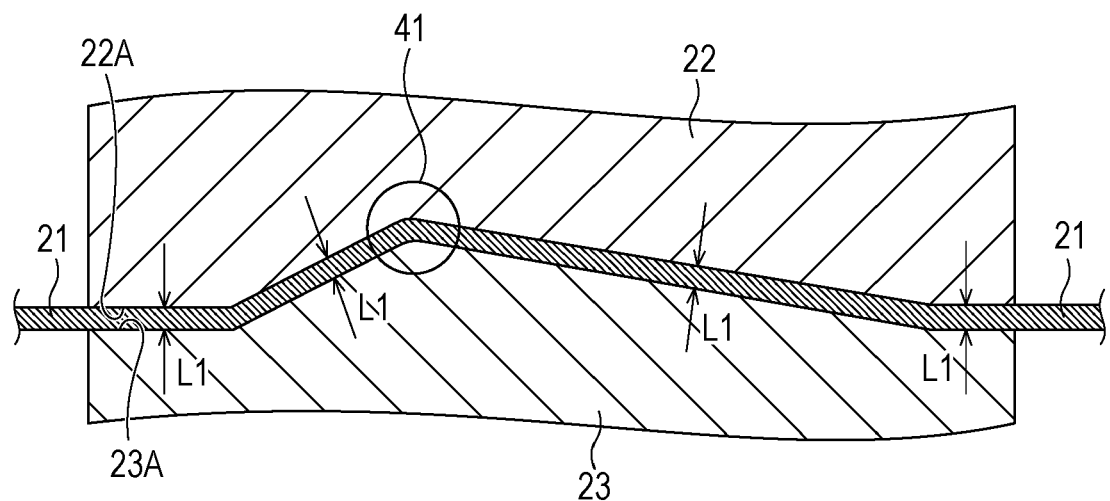
FIGS. 4A and 4B are cross-sectional views illustrating the press forming apparatus according to an example of the invention.
Figure 4B:
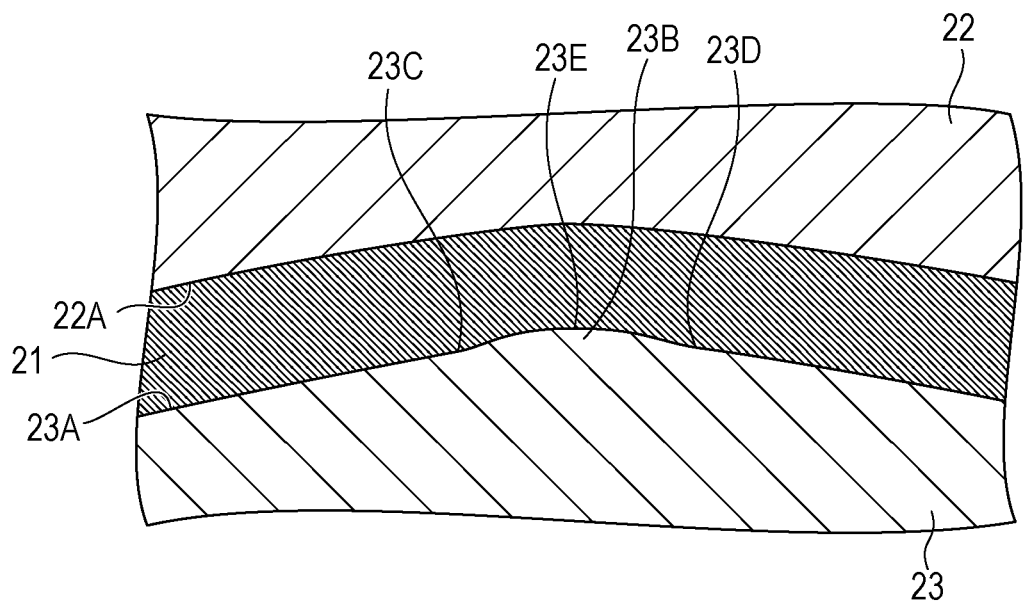

FIG. 1A is a front view illustrating an outer panel 10 formed by a press forming apparatus 20 according to the example. FIG. 1B is a magnified cross-sectional view of the outer panel 10 formed by the press forming apparatus 20 according to the example. FIG. 2 is a schematic view illustrating the press forming apparatus 20 according to the example. FIG. 3A is a cross-sectional view illustrating an upper die 22 and a lower die 23 included in the press forming apparatus 20 according to the example. FIG. 3B is a cross-sectional view illustrating the lower die 23 of the press forming apparatus 20 according to the example. FIG. 4A and FIG. 4B are cross-sectional views each illustrating the press forming apparatus 20 according to the example that are performing the press forming by using the upper die 22 and the lower die 23.

The press forming apparatus 20 (see FIG. 2) produces the outer panel 10, which is used in a vehicle such as an automobile, by press forming a steel plate or a hard-to-form material such as an aluminum alloy plate. The recent outer panel 10 is more likely to be formed of an aluminum alloy plate instead of a steel plate to reduce the weight of the vehicle. The outer panel 10, which provides an exterior appearance of the vehicle, has a character line 11 formed by press forming to improve the appearance of the vehicle and to increase the panel stiffness of the outer panel 10, for example. Examples of the hard-to-form material include a titanium alloy plate and a magnesium alloy plate in addition to the aluminum alloy plate.

FIG. 1A illustrates a door as an example of the outer panel 10. The outer panel 10 has a press-formed character line 11 extending in a front-rear direction of the vehicle, for example. The character line 11 having a curved surface protrudes outwardly from the vehicle and extends linearly toward the rear side of the vehicle. The character line 11 of the door provides the vehicle with a sharp impression and allows the door to restore its shape when pushed hard during the car wash. The door is unlikely to be dented.

The radius of curvature of the curved surface of the character line 11 has been recently made very small to improve the appearance. A high-precision press-forming technology is required to prevent cracking in the formation area of the character line 11 and to prevent line displacement of the character line 11, for example, during the press forming of the outer panel 10. The outer panel 10 may be used as a hood, a roof, a fender, or a trunk lid of a vehicle, for example.

FIG. 1B is a magnified view of a portion of the formation area of the character line 11 in the outer panel 10, which is indicated by a circle 12 in FIG. 1A. A design surface 10A of the outer panel 10, which comes in contact with the die surface 22A (see FIG. 3A) of the upper die 22 (see FIG. 3A) during the press forming, has a shape corresponding to the die surface 22A. As illustrated, the formation area of the character line 11 is a curved surface having a radius of curvature of R3 (radius of 3 mm), for example. The ridge line of the top 11A of the character line 11 extends linearly toward the rear side of the vehicle, as described above. The die surface 22A of the upper die 22 presses portions on both sides of the curved surface of the character line 11 hard. Thus, the portions continuous with the curved surface are flat along the die surface 22A.

In the formation area of the character line 11, an opposite surface 10B opposite the design surface 10A of the outer panel 10 is recessed toward the design surface 10A, forming a thin portion in the outer panel 10. The recessed portion has a curved concave surface having a radius of curvature of R3, for example. The top 10C of the recessed portion having the curved concave surface extends along the ridge line of the top 11A of the character line 11 in the design surface 10A.

As indicated by circles 13 and 14, portions of the outer panel 10 on both sides of the recessed portion having the curved concave surface protrude to have curved convex surfaces, forming thick portions in the outer panel 10. The opposite surface 10B of the outer panel 10, which comes in contact with the die surface 23A (FIG. 3A) of the lower die 23 (FIG. 3A) during the press forming, is a curved surface corresponding to the die surface 23A. This is described later in detail.

Although the opposite surface 10B of the outer panel 10 protrudes to form the thick portions each having a curved convex surface on both sides of the recessed portion having a curved concave surface, the thick portions do not adversely affect the appearance of the vehicle, because an inner panel (not illustrated) is attached to the opposite surface 10B of the outer panel 10. The opposite surface 10B of the outer panel 10 is not necessarily the curved surface corresponding to the die surface 23A of the lower die 23. The thick portion may have a shape not corresponding to the die surface 23A depending on the fluidity of the aluminum alloy plate 21 (FIG. 1B) during the press forming.

As illustrated in FIG. 2, the press forming apparatus 20 mainly includes the upper die 22 and the lower die 23, which sandwich the aluminum alloy plate 21 therebetween for press forming, a base 24 on which the lower die 23 is fixed, a fixer 25 that fixes the aluminum alloy plate 21 during the press forming, a driving mechanism (not illustrated) that moves the upper die 22 and the fixer 25 up and down, and a controller (not illustrated) that controls the driving mechanism. The driving mechanism includes a known electrical hydraulic unit, for example. The controller includes a CPU, for example. The controller may be a known electrical control unit that controls the press forming apparatus 20, for example. In the following description, the upper die 22 and the lower die 23 of the press forming apparatus 20 according to the example are mainly described, and the driving mechanism and the controller are not described.

The press forming apparatus 20 includes the fixer 25 extending along the outline of the upper die 22. An aluminum alloy plate 21 to be subjected to the press forming is placed on the die surface 23A of the lower die 23, and then the upper portion of the fixer 25 is moved down toward the lower die 23 by the controller and the driving mechanism such that the end portion of the aluminum alloy plate 21 is held between the upper and lower portions of the fixer 25. The fixer 25 holds the aluminum alloy plate 21 with a predetermined pressing force, and thus predetermined tensile strength is applied to the aluminum alloy plate 21, preventing creases possibly made by the press forming.

Next, the upper die 22 located at the top dead point is moved down to the bottom dead point such that the aluminum alloy plate 21 is pressed between the die surface 22A of the upper die 22 and the die surface 23A of the lower die 23. In this press forming, the aluminum alloy plate 21 is pressed between the portions of the upper die 22 and the lower die 23 indicated by the circles 26 and 27, and thus the character line 11 (FIG. 1B) is formed in the design surface 10A of the outer panel 10.

The die surface 23A of the lower die 23 has a curved convex portion 23B protruding toward the die surface 22A of the upper die 22 (FIG. 3A) at the portion indicated by the circle 27 and concave portions 23C and 23D continuous with the convex portion 23B on both sides of the convex portion 23B (FIG. 3A). This configuration is described in detail later. The portion of the die surface 22A of the upper die 22 indicated by the circle 26 has a shape corresponding to the character line 11. At the final stage of the press forming, the aluminum alloy plate 21 is pressed against the die surface 22A of the upper die 22 by the convex portion 23B of the die surface 23A of the lower die 23. This applies compressive stress to the aluminum alloy plate 21. This press forming process does not cause the aluminum alloy plate 21 to have a crack in the formation area of the character line 11, and thus the high-precision and high-quality outer panel 10 is formed.

Then, the upper die 22 and the upper portion of the fixer 25 of the press forming apparatus 20 are moved up to the top dead point by the controller and the driving mechanism. This is the end of the press forming of the aluminum alloy plate 21.

FIG. 3A illustrates a magnified view of the portions indicated by the circles 26 and 27 in FIG. 2. In FIG. 3A, the upper die 22 is located at the bottom dead point. The aluminum alloy plate 21 is not illustrated for ease of explanation.

In the formation area of the character line 11, a portion including the top 22B of the die surface 22A of the upper die 22 has a curved surface having a radius of curvature of R3, for example. The ridge line of the top 22B extends along the character line 11. Portions of the die surface 22A on both sides of the character line 11 are flat and continuous with the curved surface. In this example, the die surface 22A of the upper die 22 comes in contact with the aluminum alloy plate 21 during the press forming and the die surface 22A of the upper die 22 forms the design surface 10A in the outer panel 10, i.e., the character line 11.

The dot line near the die surface 23A of the lower die 23 indicates an offset line 28 of the die surface 22A of the upper die 22. The die surface 23A of the lower die 23 has the convex portion 23B corresponding to the portion including the top 22B of the die surface 22A of the upper die 22. The convex portion 23B protrudes beyond the offset line 28 toward the die surface 22A of the upper die 22. The convex portion 23B has a curved surface having a radius of curvature of R3, which is the same as the radius of curvature of the curved die surface 22A of the upper die 22, for example. The ridge line of the top 23E of the convex portion 23B also extends along the character line 11.

The die surface 23A of the lower die 23 has the concave portions 23C and 23D continuous with the convex portion 23B on both sides of the convex portion 23B. The concave portions 23C and 23D are recessed beyond the offset line 28. The concave portions 23C and 23D each have a radius of curvature equal to or larger than that of the curved convex portion 23B. In this example, the concave portions 23C and 23D each have a curved surface having a radius of curvature of R3, for example. The portions of the die surface 23A located outwardly from the concave portions 23C and 23D have flat surfaces extending along the offset line 28.

FIG. 3B indicates the shape of the die surface 23A of the lower die 23. Specifically described, the die surface 23A having the convex portion 23B and the concave portions 23C and 23D are designed by the following method. The design method of a portion of the convex portion 23B and the concave portion 23C corresponding to the left half of the character line 11 in the drawing sheet is described below. A portion of the convex portion 23B and the concave portion 23D corresponding to the right half of the character line 11 in the drawing sheet are designed in the same as above, and the design method is not described.

In this example, the aluminum alloy plate 21 having a thickness of 1.0 mm is used, for example. The distance L1 between the die surface 22A of the upper die 22 located at the bottom dead point and the die surface 23A of the lower die 23 is 1.0 mm, which is equal to the thickness of the aluminum alloy plate 21. The convex portion 23B of the lower die 23 protrudes beyond the offset line by 0.2 mm, which is the total of 10% of a predicted decrease in the thickness of the aluminum alloy plate 21 and 10% of the thickness of the aluminum alloy plate 21. The distance L2 between the top 22B of the die surface 22A of the upper die 22 and the top 23E of the die surface 23A of the lower die 23 is 0.8 mm. In other words, the portion of the press-formed character line 11 including the top 11A (FIG. 1B) has a thickness of 0.8 mm, because the die surface 23A of the lower die 23 has the above-described curved shape. The outer panel 10 does not have a local thin portion in the formation area of the character line 11, preventing the outer panel 10 from having a crack, for example.

As illustrated in the drawings, first, a circle S1 having a radius of curvature of R3 is formed such that the center C1 is on a dot line 31 extending through the top 22B and the top 23E. The center C1 of the circle S1 is set on the dot line 31 such that the portion including the top 11A of the character line 11 has the above-described thickness of 0.8 mm. Next, a circle S2 having a radius of curvature of R3 is formed such that the circle S2 is in contact with the circle S1 at a position below the offset line 28, i.e., at the lower die 23 side (lower side in the drawing sheet). Finally, a circle S3 having a radius of curvature of R3 is formed such that the circle S3 is in contact with the offset line 28 and the circle S2.

The circle S2 is formed such that an angle θ between the dot line 31 and a dot line 32, which extends through the center C1 of the circle S1 and the center C2 of the circle S2, is not less than 45 degrees and not more than 90 degrees. As described above, the radius of curvature of each of the circles S2 and S3 is suitably set at a value equal to or greater than that of the circle S1.

In this configuration, the die surface 23A of the convex portion 23B (FIG. 3A) of the lower die 23 curves along the circle S1. The die surface 23A of the concave portion 23C of the lower die 23 curves substantially along the circle S2 and is continuous with the circles S1 and S3, which are located on both sides of the circle S2. If the angle θ is smaller than 45 degrees, the concave portion 23C does not recess enough beyond the offset line 28 or the concave portion 23C is not formed. This allows the design surface of the aluminum alloy plate 21 to be raised during the press forming, readily resulting in defective formation. If the angle θ is larger than 90 degrees, the concave portion 23C recesses beyond the offset line 28 too much, making it impossible to produce the lower die 23. In other words, the die surfaces 23A of the convex portion 23B and the concave portion 23C are suitably designed depending on the thickness or the appearance of the aluminum alloy plate 21 within the above-described range of the angle θ.

FIG. 4A schematically illustrates positional relationship between the upper die 22 located at the bottom dead point and the lower die 23. As illustrated, the upper die 22 has been moved down until the distance L1 between the die surface 22A of the upper die 22 and the die surface 23A of the lower die 23 becomes substantially equal to the thickness of the aluminum alloy plate 21.

FIG. 4B is a magnified view illustrating a portion indicated by a circle 41 in FIG. 4A. As illustrated, the die surface 23A of the lower die 23 has the curved convex portion 23B, which makes the thickness of the formation area of the character line 11 small. The formation material of the aluminum alloy plate 21 at the convex portion 23B moves to the concave portions 23C and 23D of the die surface 23A of the lower die 23. This configuration prevents the design surface of the aluminum alloy plate 21 from being raised during the press forming, allowing the die surface 22A of the upper die 22 to reliably come in contact with the design surface of the aluminum alloy plate 21. Thus, a pressing force is reliably applied to the design surface.

Furthermore, the aluminum alloy plate 21 has a lower critical strain for cracking (forming limit) than a steel plate and is likely to be broken upon receiving of a large tensile strength during the press forming. In particular, the aluminum alloy plate 21 is stretched to the left and right sides of the character line 11 at the top 23E of the convex portion 23B of the lower die 23. This allows the aluminum alloy plate 21 to readily reach the critical strain for cracking. To solve the problem, as described above, the convex portion 23B of the lower die 23 applies the compressive stress to the aluminum alloy plate 21 at the final stage of the press forming. This changes the deformation state of the aluminum alloy plate 21 from planar elongation to uniaxial elongation. This raises the critical strain for cracking. Thus, the formation area of the character line 11 is unlikely to have a local thin portion, surface roughness, and necking, which are possible causes of cracking.

In short, as illustrated in FIG. 4A, in the press forming apparatus 20, the die surface 22A of the upper die 22 reliably applies a pressing force to the aluminum alloy plate 21 while being in contact with the design surface of the aluminum alloy plate 21. This prevents the aluminum alloy plate 21 from having defective formation, possibly caused by springback, the line displacement, and the cracking. Thus, the die surface 22A of the upper die 22 forms the design surface having the character line 11, for example, with a high degree of precision.

The press forming apparatus 20 according to the example includes the upper die 22 and the lower die 23. The upper die 22 has the die surface 22A that is configured to form the design surface 10A of the outer panel 10. The lower die 23 has the die surface 23A corresponding to the die surface 22A of the upper die 22. The die surface 23A of the lower die 23 has, in the formation area of the character line 11, the curved convex portion 23B that protrudes beyond the offset line 28 and the curved concave portions 23C and 23D continuous with the curved convex portion 23B on both sides of the curved convex portion 23B. The curved concave portions 23C and 23D are recessed beyond the offset line 28. With this configuration, at the final stage of the press forming, compressive stress is applied to the aluminum alloy plate 21. Thus, the aluminum alloy plate 21 does not have a crack in the formation area of the character line 11, forming the high-precision and high-quality outer panel 10.

In the press forming apparatus 20 of the example, the concave portions 23C and 23D of the lower die 23 in the formation area of the character line 11 each have a radius of curvature equal to or larger than that of the convex portion 23B. With this configuration, the design surface of the aluminum alloy plate 21 reliably comes in contact with the die surface 22A of the upper die 22 during the press forming, forming the character line 11 having a very small radius of curvature, which provides the outer panel 10 with good appearance.

In the press forming apparatus 20 of the example, connection points between the curved convex portion 23B and the curved concave portions 23C and 23D of the die surface 23A of the lower die 23 in the formation area of the character line 11 are located below the offset line 28. With this configuration, the aluminum alloy plate 21 is not raised toward the design surface, forming the high-precision and high-quality character line 11 in the outer panel 10.

In the press forming apparatus 20 of the example, the lower die 23 having the above-described die surface 23A enables the high-precision and high-quality press forming of the outer panel 10 formed of the aluminum alloy plate 21.

The outer panel 10 according to the example has the design surface 10A that has the character line 11 having a curved surface and the opposite surface 10B that has portions forming a thin portion having a curved surface and thick portions each having a curved surface. The thin portion extends along the character line 11. With this configuration, the design surface 10A of the outer panel 10 has a high-precision and high-quality shape corresponding to the die surface 22A of the upper die 22, improving the appearance of the vehicle.

In this example, the outer panel 10, which is produced by the press forming apparatus 20, is formed of the aluminum alloy plate 21. However, the outer panel 10 may be formed of a steel plate or the above-described hard-to-form material, instead of the aluminum alloy plate 21. In such a case, the similar effects to those obtained in the case of the aluminum alloy plate 21 are obtained. Furthermore, various changes may be made without departing from the spirit of the invention.

The invention claimed is:

1. A press forming apparatus configured to produce a character line in a design surface of an outer panel by press forming, comprising:
   an upper die that has a die surface that is configured to form the design surface of the outer panel; and
   a lower die that has a die surface corresponding to the die surface of the upper die, wherein
   the die surface of the lower die has, in a formation area of the character line, a curved convex portion that protrudes upwardly above a reference line that is complementary to a contour of the die surface of the upper die and curved concave portions continuous with the curved convex portion, each of the curved concave portions being on a corresponding one of both sides of the curved convex portion and being recessed downwardly below the reference line.

2. The press forming apparatus according to claim 1, wherein a radius of curvature of each of the concave portions is equal to or greater than a radius of curvature of the convex portion.

3. The press forming apparatus according to claim 2, wherein connection points between the curved convex portion and the curved concave portions are located below the reference line.

4. The press forming apparatus according to claim 1, further comprising connection points between the curved convex portion and the curved concave portions, and wherein the connection points are located below the reference line.

5. The press forming apparatus according to claim 1, wherein, in a cross-sectional view of the press forming apparatus, the reference line is identical to the contour of the die surface of the upper die in shape.

* * * * *